(12) United States Patent
Chamberlin et al.

(10) Patent No.: US 8,633,622 B2
(45) Date of Patent: Jan. 21, 2014

(54) ELECTRIC MOTOR AND PLANETARY GEAR ASSEMBLY

(75) Inventors: Bradley D. Chamberlin, Pendleton, IN (US); Balazs Palfai, Fishers, IN (US); Larry A. Kubes, Indianapolis, IN (US)

(73) Assignee: Remy Technologies LLC, Pendleton, IN (US)

( * ) Notice: Subject to any disclaimer, the term of this patent is extended or adjusted under 35 U.S.C. 154(b) by 426 days.

(21) Appl. No.: 12/947,260

(22) Filed: Nov. 16, 2010

(65) Prior Publication Data

US 2011/0115321 A1 May 19, 2011

Related U.S. Application Data

(60) Provisional application No. 61/261,635, filed on Nov. 16, 2009.

(51) Int. Cl.
*H02K 7/116* (2006.01)
*F16H 48/06* (2006.01)
*B60K 7/00* (2006.01)

(52) U.S. Cl.
USPC ............. 310/83; 475/149; 475/150; 180/65.7

(58) Field of Classification Search
USPC .................... 310/83; 475/5, 149–150, 296; 180/65.51, 65.5, 65.7
See application file for complete search history.

(56) References Cited

U.S. PATENT DOCUMENTS

| | | | | |
|---|---|---|---|---|
| 1,235,046 A | * | 7/1917 | Nikonow | 475/13 |
| 3,812,928 A | * | 5/1974 | Rockwell et al. | 180/65.51 |
| 4,185,215 A | * | 1/1980 | Montagu | 310/83 |
| 4,274,023 A | * | 6/1981 | Lamprey | 310/83 |
| 4,583,427 A | * | 4/1986 | Blattmann | 475/283 |
| 5,126,582 A | * | 6/1992 | Sugiyama | 290/46 |
| 5,163,528 A | * | 11/1992 | Kawamoto et al. | 180/65.51 |
| 5,195,389 A | | 3/1993 | Isozumi | |
| 5,293,107 A | * | 3/1994 | Akeel | 318/568.11 |
| 5,643,119 A | | 7/1997 | Yamaguchi et al. | |
| 5,677,582 A | * | 10/1997 | Lutz et al. | 310/75 R |
| 6,109,122 A | | 8/2000 | Bori et al. | |
| 6,428,442 B1 | | 8/2002 | Turgay | |
| 6,500,087 B2 | * | 12/2002 | Klinger et al. | 475/149 |
| 6,707,189 B2 | * | 3/2004 | Ito et al. | 310/75 R |
| 6,869,378 B2 | * | 3/2005 | Yamasaki et al. | 475/149 |
| 7,118,506 B2 | * | 10/2006 | Zheng et al. | 475/18 |
| 7,407,460 B2 | * | 8/2008 | Eisenhardt | 475/303 |
| 7,828,687 B2 | | 11/2010 | Nagy et al. | |
| 2006/0116233 A1 | | 6/2006 | Gradu | |
| 2008/0053725 A1 | * | 3/2008 | Kramer | 180/65.5 |
| 2008/0308336 A1 | * | 12/2008 | van Rooij | 180/205 |
| 2009/0233754 A1 | * | 9/2009 | Pedersen | 475/296 |

FOREIGN PATENT DOCUMENTS

DE 19827756 * 12/1999 ............. H02K 7/116

OTHER PUBLICATIONS

R.J.Ferguson "Short Cuts for Analyzing Planetary Gearing" Machine Design, pp. 55-58, May 26, 1983.*

* cited by examiner

*Primary Examiner* — Burton Mullins
(74) *Attorney, Agent, or Firm* — Maginot, Moore & Beck LLP

(57) ABSTRACT

An electric motor assembly includes a stator defining a first interior space, a rotor positioned within the first interior space and configured for rotation relative to the stator, the rotor defining a second interior space, and a planetary gear assembly associated with the rotor and at least partially positioned within the second interior space.

20 Claims, 14 Drawing Sheets

ELECTRIC MOTOR AND PLANETARY GEAR ASSEMBLY

CROSS-REFERENCE TO RELATED APPLICATION

The present application claims the benefit of U.S. provisional patent application No. 61/261,635, filed Nov. 16, 2009, the contents of which are incorporated herein by reference.

FIELD

The present application relates to the field of mechanical power transmission, and more particularly to planetary gear assemblies, including planetary gear assemblies used in vehicles.

BACKGROUND

A planetary gear assembly converts an input rotation to an output rotation. Typically, a gear ratio of the planetary gear assembly is configured such that the output rotation has a different angular velocity and torque than the input rotation. In one application, a planetary gear assembly is coupled to the rotational output of an electric motor. The planetary gear assembly may be used to convert the rotational output of the electric motor to a rotational output having torque and angular velocity characteristics suitable for the particular application.

The typical planetary gear assembly includes a sun gear, numerous planet gears, and a ring gear. The sun gear has a toothed exterior periphery and defines a central axis. The planet gears each have a toothed exterior periphery that is configured to mesh with the toothed exterior periphery of the sun gear. The ring gear, which is sometimes referred to as an annulus, has a toothed interior periphery that is configured to mesh with the toothed exterior periphery of the planet gears. The ring gear has a central axis, which is coaxial with the central axis of the sun gear. Some planetary gear assemblies also include a carrier, which is connected to each of the planet gears. The carrier also defines a central axis, which is coaxial with the central axis of the sun gear.

Operation of a planetary gear assembly that includes a planet gear carrier involves (i) fixing the position of one of the ring gear, the carrier, and the sun gear; (ii) rotating another one of the ring gear, the carrier, and the sun gear; and (iii) generating a rotational output at the remaining one of the ring gear, the carrier, and the sun gear. For example, in one configuration, the ring gear is maintained in a fixed position, the sun gear receives an input rotation, and an output rotation is generated at the planet carrier, which rotates about its central axis.

In general, planetary gear assemblies are designed and machined to introduce a particular gear ratio between the input rotation and the output rotation. Therefore, most planetary gear assemblies are application specific devices. In view of the foregoing, it would be desirable to utilize a particular planetary gear assembly in multiple applications. However, parameters such as input angular velocity, input torque, output angular velocity, output torque, and maximum operating speed, often restrict the potential use of a planetary gear assembly to only a limited number of applications. In addition, the continuing desire to increase the efficiency of electric products makes it desirable for electric motors and planetary gear assemblies to generate more output torque with a system that occupies less space. Accordingly, further advancements are desirable for planetary gear assemblies.

SUMMARY

An electric motor assembly, which includes a planetary gear assembly has been developed. The electric motor assembly includes a stator defining a first interior space, a rotor positioned within the first interior space and configured for rotation relative to the stator, the rotor defining a second interior space, and a planetary gear assembly associated with the rotor and at least partially positioned within the second interior space.

According to another embodiment of the present disclosure an electric motor assembly includes a housing defining an internal space, a stator positioned within the internal space, a rotor associated with the stator and positioned within the internal space, and a planetary gear assembly coupled to the rotor and the housing and at least partially positioned within the internal space.

In yet another embodiment of the present disclosure an electric motor assembly includes a housing, a stator positioned completely within the housing and defining an internal space, the internal space extending from a first end turn of the stator to a second end turn of the stator, a rotor positioned completely within the housing and positioned completely within the internal space, the rotor being configured for rotation relative to the stator, and a planetary gear assembly positioned completely within the housing and positioned at least partially within the internal space, the planetary gear assembly being associated with the rotor, wherein the planetary gear assembly provides a rotational output of the electric motor assembly.

BRIEF DESCRIPTION OF THE FIGURES

FIG. 11 is a cross sectional view of the electric motor assembly of FIG. 3, having the planetary gear assembly of FIG. 4 oriented in the first position and having an output shaft connected to a sun gear of the planetary gear assembly;

DETAILED DESCRIPTION

Figure 1:
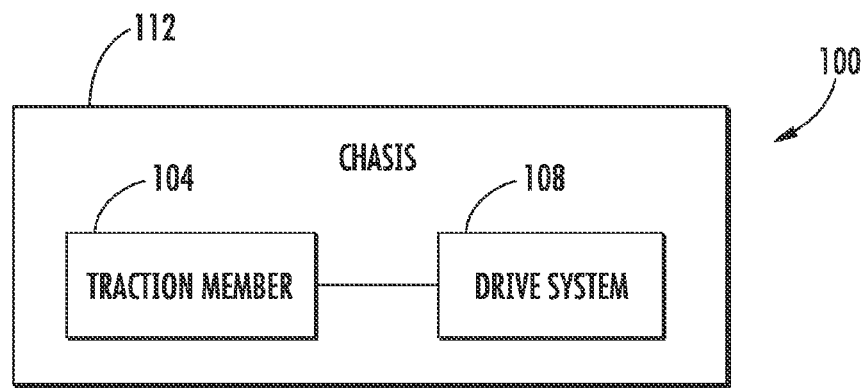
FIG. 1 is a block diagram illustrating a vehicle including a chassis, a traction member, and a drive system.

As shown in FIG. 1, a vehicle 100 includes a traction member 104 connected to a drive system 108 and positioned in a chassis 112. The vehicle 100 is a ground traversing vehicle such as a car, light duty truck, commercial duty truck (tractor trailer), golf cart, motorcycle, all-terrain vehicle, or the like. The chassis 112 provides a framework, which supports and positions the drive system 108 and the traction member 104. Accordingly, depending on the type of vehicle 100, the chassis 112 may be formed from metal, fiberglass, and/or other types of suitable materials.

Figure 2:
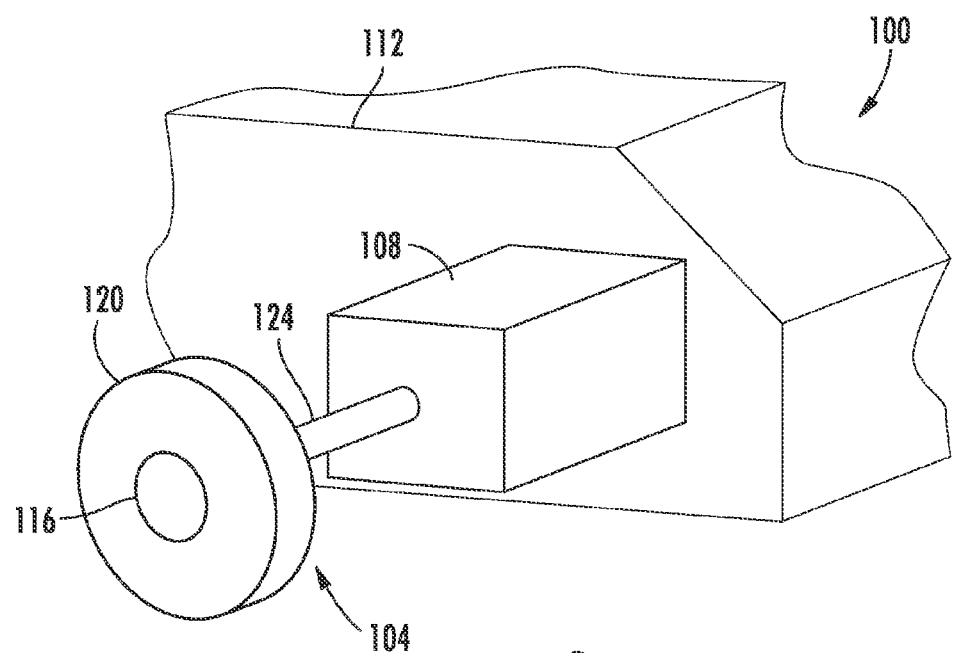
FIG. 2 is side perspective view illustrating a portion of the vehicle of FIG. 1.

As shown in FIG. 2, in at least one embodiment the traction member 104 includes a wheel 116 and a tire 120. The traction member 104 is mechanically coupled to the drive system 108 by an axle 124. The axle 124 transmits a rotational force generated by the drive system 108 into a traction force that moves the vehicle 100. Rotation of the axle 124 rotates the wheel 116 and the tire 120. The vehicle 100 may include multiple wheels 116 and tires 120 to support the chassis 112; however, for simplicity, only one wheel and one tire are illustrated in FIG. 2.

Figure 3:
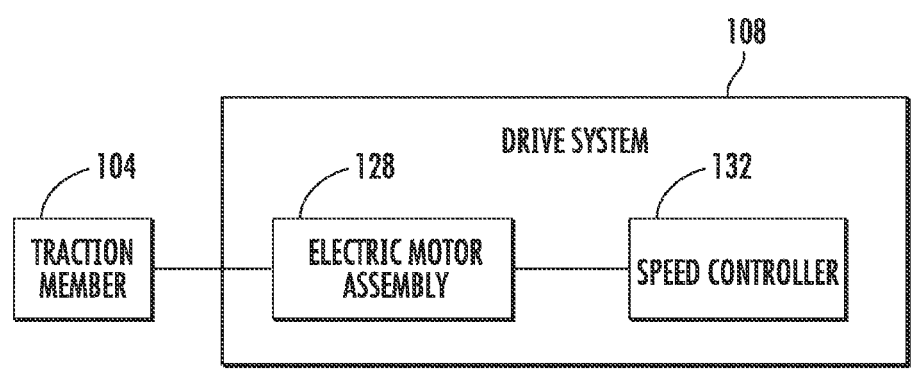
FIG. 3 is a block diagram of the drive system of FIG. 1, including a speed controller and an electric motor assembly.

As shown in FIG. 3, the drive system 108 includes an electric motor assembly 128 electrically coupled to a speed controller 132. The electric motor assembly 128 generates a drive torque that is coupled to the traction member 104 to move the vehicle 100. The speed controller 132 controls the torque generated by the electric motor assembly 128, such that the speed of the vehicle 100 may be controlled. The speed controller 132 may be any type of electronic controller configured to control an output torque and/or the angular velocity of an electric motor, as known to those of ordinary skill in the art.

Figure 4:
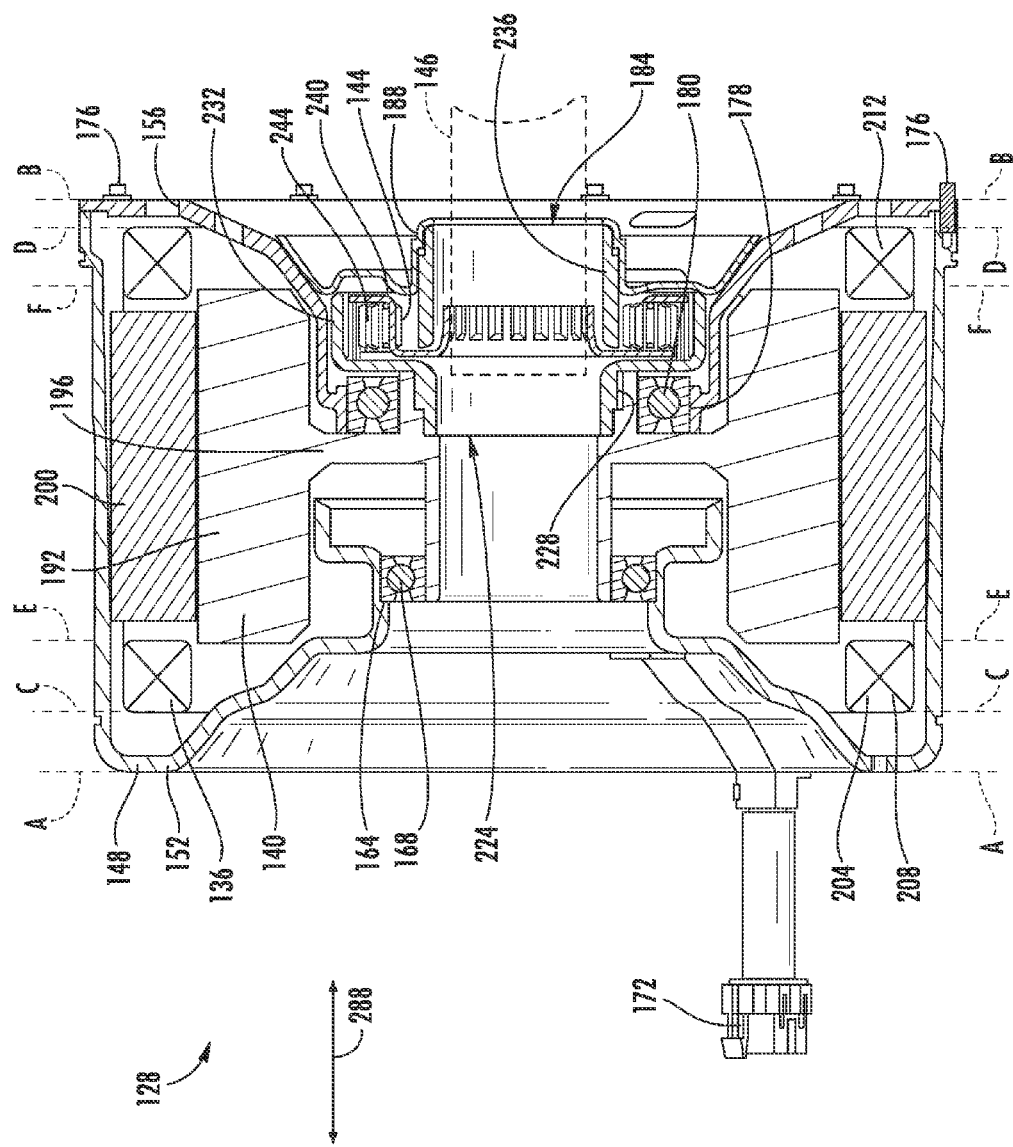
FIG. 4 is a cross sectional view of the electric motor assembly of FIG. 3, having a planetary gear assembly oriented in a first position and an output shaft connected to a carrier of the planetary gear assembly.

As shown in FIG. 4, the electric motor assembly 128 includes a stator 136, a rotor 140, and a planetary gear assembly 144, each at least partially positioned within a housing 148. The planetary gear assembly 144 is shown being connected to a shaft 146 (shown in phantom), which may be the axle 124 (FIG. 2). The housing 148 is typically a metal casing, such as a steel casing or a cast aluminum casing. The housing 148, however, could also be comprised of any other suitable material. The housing 148 includes a bowl portion 152 connected to a cover plate portion 156. Together, the bowl 152 and the cover plate 156 define a housing internal space in which the stator 136, the rotor 140, and the planetary gear assembly 144 are at least partially positioned. The housing internal space includes the volume bounded by the opposite ends of the housing 148, as noted by dashed lines A and B.

The bowl 152 of the housing 148 defines a seat 164 configured to receive a left bearing 168. The bowl 152 may also include an opening (not shown) to enable an electrical connector 172 to extend through the bowl and into the housing internal space.

In another embodiment (not shown in the figures), the electric motor assembly 128 includes a housing having a three-piece configuration. The three-piece housing includes a first end cap and a second end cap connected to a generally cylindrical body portion. The first end cap is similar or identical to the cover plate 156. The second end cap defines a seat to support the left bearing 168. The stator 136, the rotor 140, and the planetary gear assembly 144 are at least partially positioned within the body portion.

The cover plate 156, as shown in FIG. 4, connects to the bowl 152 of the housing 148 with numerous fasteners 176. The cover plate 156 may be removed from the bowl 152 to enable adjustment and configuration of the stator 136, the rotor 140, and the planetary gear assembly 144. The cover plate 156, along with a portion of the rotor 140, defines another seat 178 configured to receive a right bearing 180. Additionally, the cover plate 156 portion of the housing 148 defines an opening 184 configured to receive and to support a portion of the planetary gear assembly 144. The center opening 184 in the housing 148 includes a splined portion having numerous splines 188 or other such connection members, which are configured to mesh with a corresponding set of splines or other such connection members formed on the portion of the planetary gear assembly 144 received by the opening 184.

With continued reference to FIG. 4, the stator 136 is positioned completely within the housing internal space (Lines A and B). The stator 136 includes a core 200 and a winding 204 extending through the core. A left set of end turns 208 of the winding 204 extends from the left side of the core 200, and a right set of end turns 212 of the winding extends from the right side of the core. An axial length of the stator 136 may be defined as the distance between the tips of the left and the right end turns 208, 212 as measured in direction 288 (FIG. 4). The stator 136 defines a stator internal space in which the rotor 140 and the planetary gear assembly 144 are at least partially positioned. The stator internal space includes the volume bounded by the left and the right end turns 208, 212, as noted by dashed lines C and D of FIG. 4.

The rotor 140 is positioned completely within the housing internal space (Lines A and B) and is positioned at least partially within the stator internal space (Lines C and D). The rotor 140 is configured to rotate relative to the housing and the stator 136 about the left and the right bearings 168, 180. The rotor 140 may be referred to as an input torque member of the planetary gear assembly 144, because it provides the planetary gear assembly with an input rotation. The rotor 140 includes permanent magnets 192 connected to a support frame 196. The permanent magnets 192 are positioned in close proximity to the core 200 of the stator 136. The frame 196 of the rotor 140 defines an opening 224 configured to receive a portion of the planetary gear assembly 144. The opening 224 in the rotor 140 includes a splined portion having numerous splines 228 or other such connection members, which are configured to mesh with a corresponding set of splines or other such connection members formed on the portion of the planetary gear assembly 144 received by the opening. The rotor 140 defines a rotor internal space in which the planetary gear assembly 144 is at least partially positioned. The rotor internal space includes the volume bounded by the lateral ends of the rotor 140, as noted by dashed lines E and F. The opening 224 in the rotor 140 is positioned within the rotor internal space.

Figure 5:
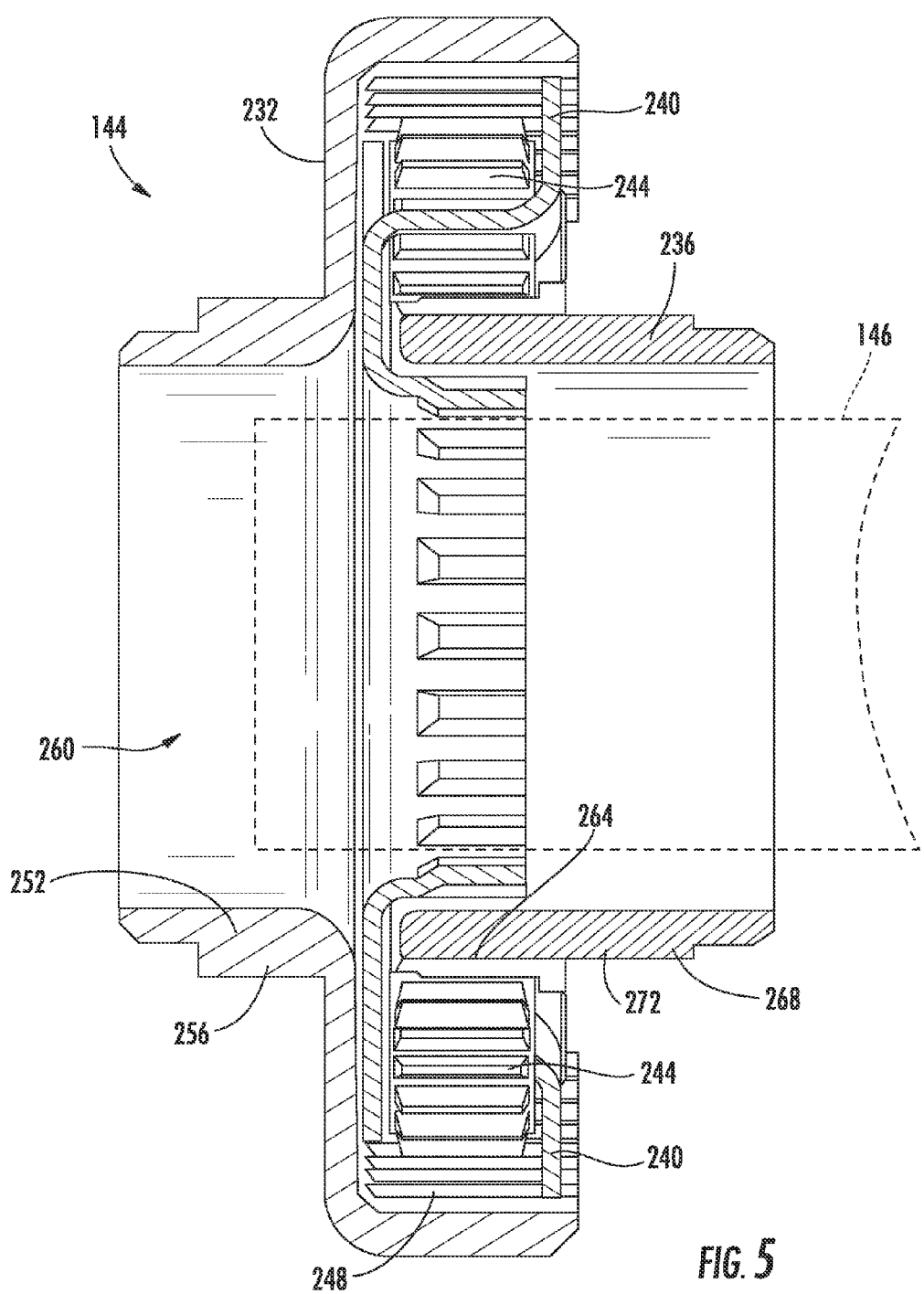
FIG. 5 is an enlarged cross sectional view of the planetary gear assembly of FIG. 4.

As shown in FIG. 5 the planetary gear assembly 144 includes a ring gear 232, a sun gear 236, a carrier 240, and numerous planet gears 244 connected to the carrier. Each of the ring gear 232, the sun gear 236, the carrier 240, and the planet gears 244 are formed from metal such as steel, or the like. The ring gear 232, which has a circular periphery, includes a toothed portion 248 and a connection portion 252. The toothed portion 248 includes numerous teeth, or the like, which are configured to engage meshingly corresponding teeth of the planet gears 244. The connection portion 252 is a splined portion having numerous splines 256 or other such connection members, which are configured to mesh with the splines 188 formed within the opening 224 of the rotor 140 (as shown in FIG. 4). When the connection portion 252 of the ring gear 232 is received by the opening 224 in the rotor 140, the ring gear rotates with the rotor and the torque generated by the rotor is transferred to the ring gear. The ring gear 232 defines an internal cavity 260 in which at least a portion of the carrier 240 is positioned.

With continued reference to FIG. 5, the sun gear 236 has a generally circular periphery and includes a toothed portion 264 and a connection portion 268. The toothed portion 264 includes numerous teeth, or the like, which are configured to engage meshingly corresponding teeth of the planet gears 244. The connection portion 268 of the sun gear 236 is a splined portion having numerous splines 272 or other such connection members, which are configured to mesh with the splines 188 formed within the opening 184 of the housing 148 (as shown in FIG. 4). When the connection portion 268 of the sun gear 236 is received by the opening 184 in the housing 148, the sun gear is fixedly connected to the housing such that the sun gear does not rotate relative to the housing. The sun gear 236 defines an internal cavity 276 in which at least a portion of the carrier 240 is positioned.

Figure 6:
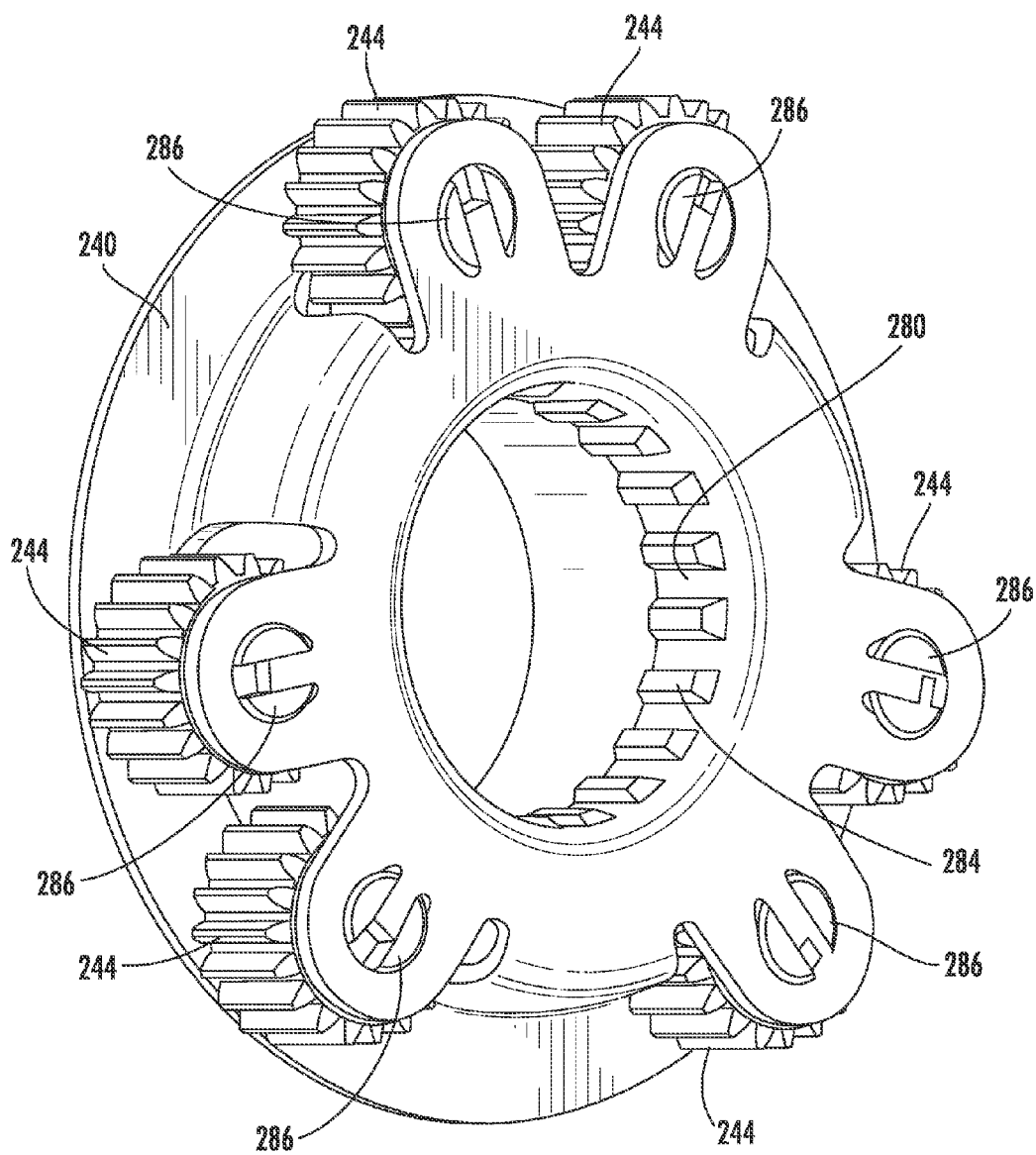
FIG. 6 is a top perspective view of planet gears and the carrier of the planetary gear assembly of FIG. 4.

As shown in FIG. 6, the planet gears 244 have a toothed exterior surface configured to rotate about a non-rotatable central post 286. The toothed surface is configured to engage meshingly the toothed portion 248 of the ring gear 232 and the toothed portion 264 of the sun gear 236 (as shown in FIG. 5). The planetary gear assembly 144 may include six planet gears 244, grouped into three clusters each separated by approximately one hundred twenty degrees.

Figure 7:
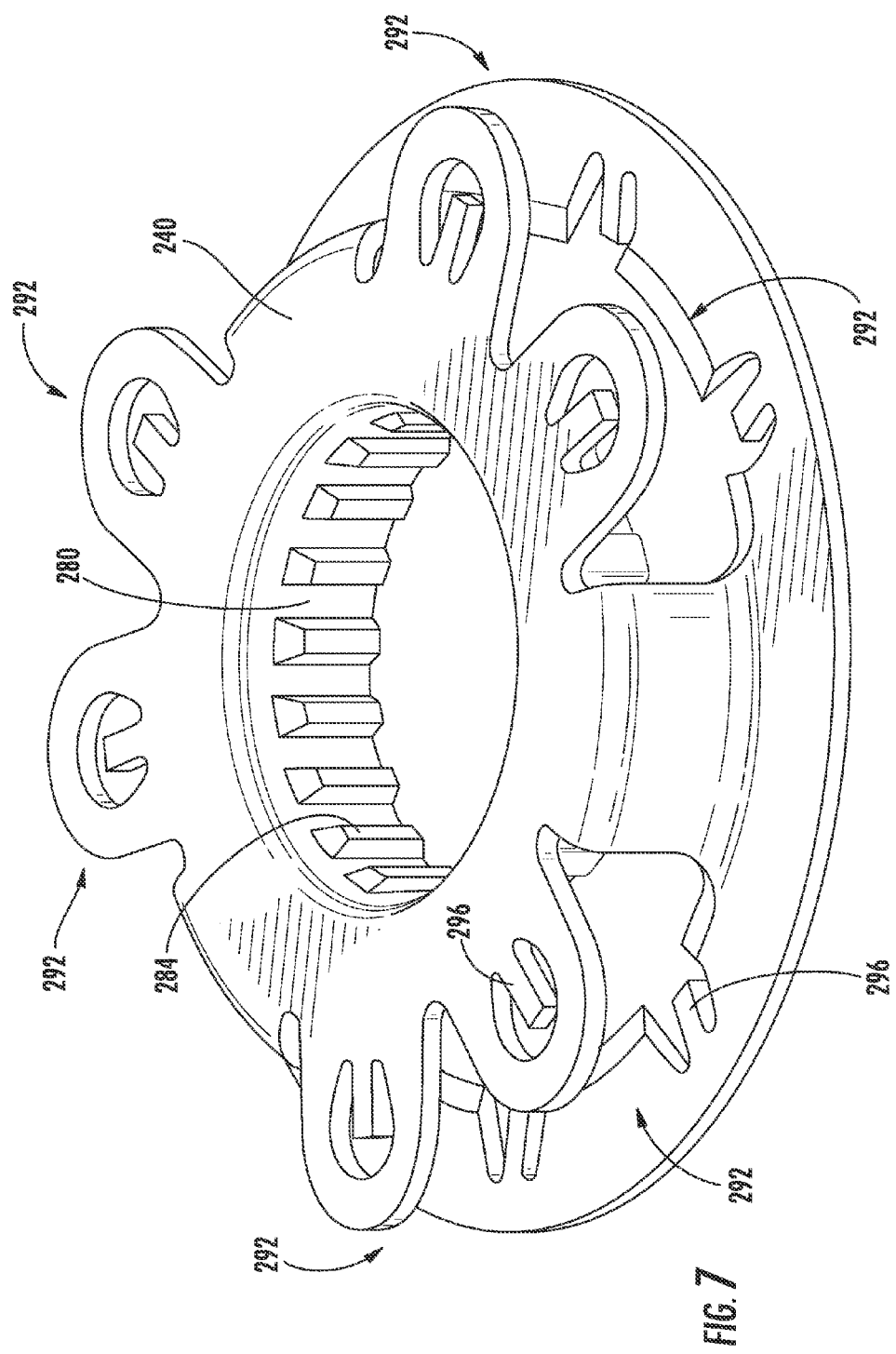
FIG. 7 is top perspective view of the carrier of FIG. 6 shown without the planet gears.
Figure 8:
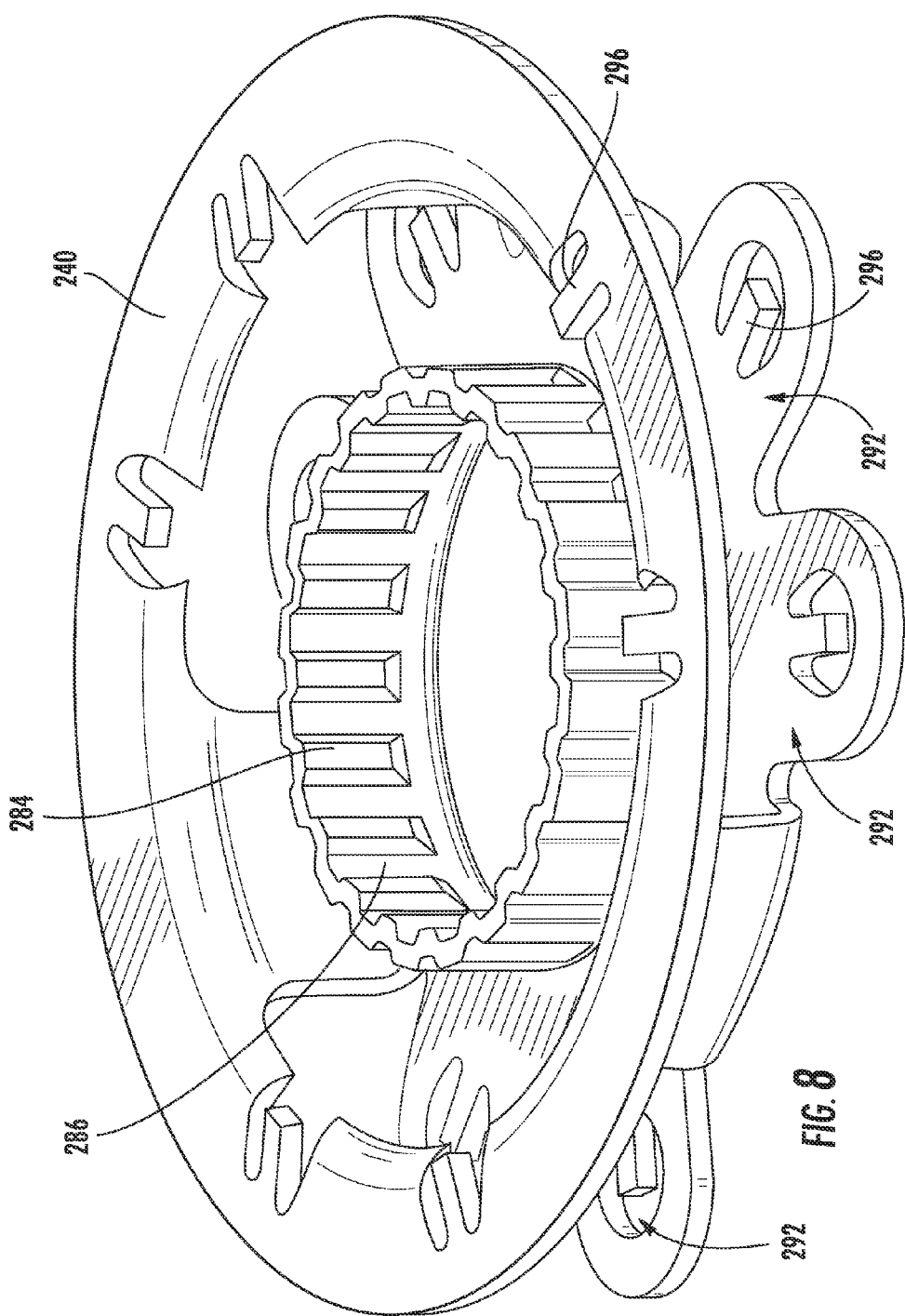
FIG. 8 is a bottom perspective view of the carrier of FIG. 6, shown without the planet gears.

As shown in FIGS. 7 and 8, the carrier 240 includes an output portion 280 of the planetary gear assembly 144 and numerous retainers 292. The output portion 280 is positioned within the internal cavity 276 defined by the sun gear 236 and within the internal cavity defined by the ring gear 232. The output portion 280 includes numerous splines 284 or other connection members that are configured to engage corresponding splines formed on the shaft 146 (FIG. 4) to be driven by the drive system 108. The retainers 292 of the carrier 240 include protrusions 296, which are received by corresponding grooves formed in the posts 286 of the planet gears 244. The protrusions 296 interlock with the grooves to prevent rotation of the posts 286 and to secure the planet gears 244 to the carrier 240.

Reversibility of the Planetary Gear Assembly

The planetary gear assembly 144 is configured to be oriented in two positions (orientations) relative to the rotor 140. As described above with reference to FIG. 4, the planetary gear assembly 144 is shown in the first position in which the connection portion 252 of the ring gear 232 is received by the opening 224 of the rotor 140, and the connection portion 268 of the sun gear 236 is received by the opening 184 of the housing 148. Accordingly, in the first position, the input torque member (i.e. the rotor 140) rotates directly the ring gear 232. The rotation of the ring gear 232 causes the planet gears 244 to rotate about their respective connection point to the carrier 240. Additionally, the rotation of the ring gear 232 causes the planet gears 244 to revolve around the central axis of the sun gear 236 and causes the carrier 240 to rotate about the central axis of the sun gear 236. The sun gear 236, which is connected to the housing 148, has a fixed position and does not rotate in response to the rotation of the rotor 140.

Figure 9:
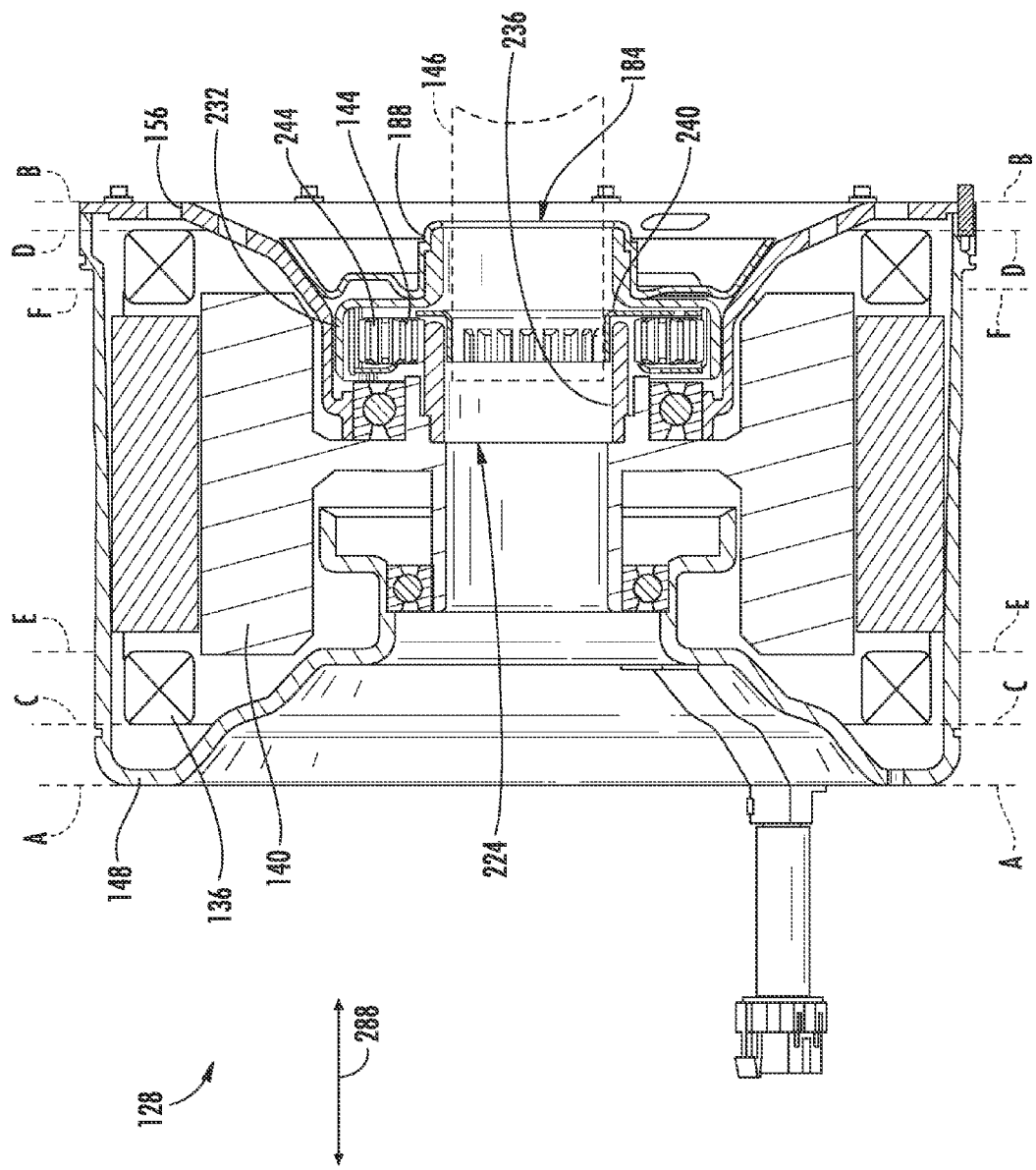
FIG. 9 is a cross sectional view of the electric motor assembly of FIG. 3, having the planetary gear assembly of FIG. 4 oriented in a second position, the output shaft remains connected to the carrier of the planetary gear assembly.

With reference next to FIG. 9, the planetary gear assembly 144 is shown in the second position relative to the rotor 140. FIG. 9 is identical to FIG. 4 and includes all of the same parts. The only difference between FIG. 4 and FIG. 9 is that the planetary gear assembly 144 has been moved to the second position. In particular, the planetary gear assembly 144 in FIG. 9 is identical to the planetary gear assembly of FIG. 4, but is shown in FIG. 9 in a reversed position (i.e. the second position) relative to the rotor. When the planetary gear assembly 144 is in the second position, the connection portion 268 of the sun gear 236 is received by the opening 224 of the rotor 140, and the connection portion 252 of the ring gear 232 is received by the opening 184 of the housing 148. In the second position, the rotor 140 directly rotates the sun gear 236. The rotation of the sun gear 236 causes the planet gears 244 to rotate about their respective connection point to the carrier 240. Additionally, the rotation of the sun gear 236 causes the planet gears 244 to revolve around the central axis of the sun gear and causes the carrier to rotate about the central axis of the sun gear. The ring gear 232, which is connected to the housing 148, has a fixed position and does not rotate in response to the rotation of the rotor 140.

Figure 10:
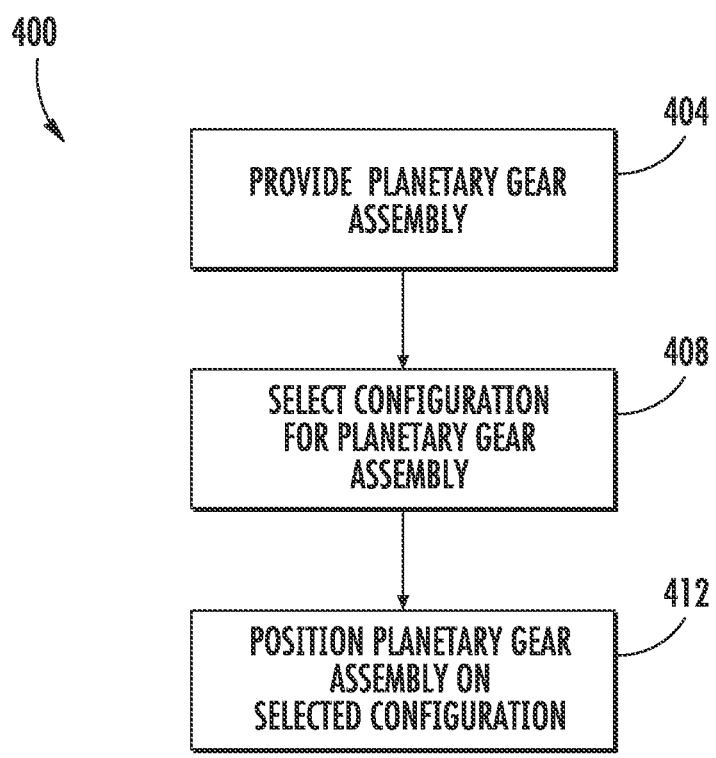
FIG. 10 is a flowchart depicting an exemplary method of operating the electric motor assembly of FIG. 3.
Figure 17:
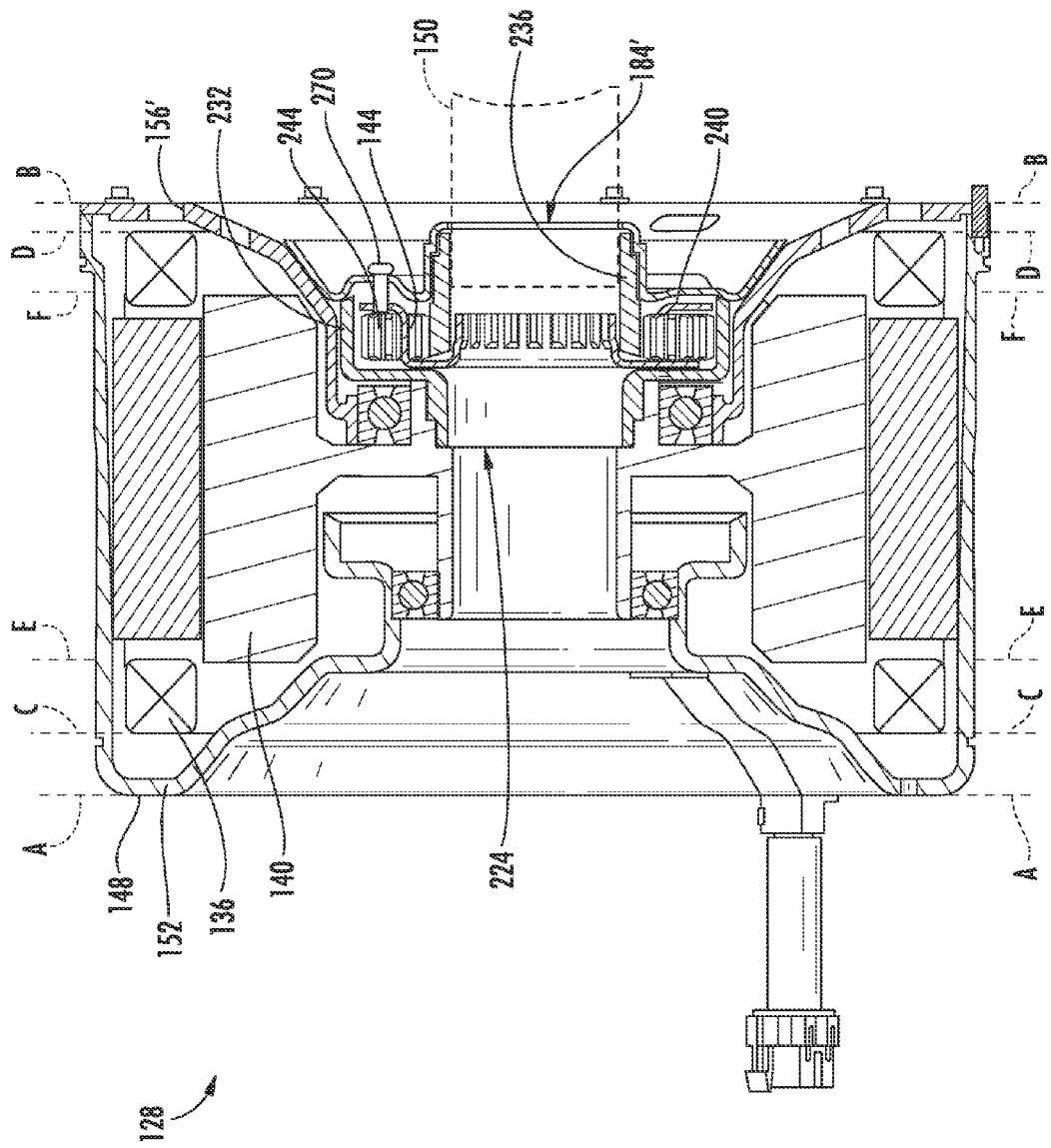

The flowchart of FIG. 10 illustrates an exemplary method 400 for arranging a gear train, such as the planetary gear assembly 144, relative to an input torque member, such as the rotor 140. In block 404, the method 400 provides the planetary gear assembly 144, which includes the ring gear 232, the sun gear 236, the planet gears 244, and the carrier 240. This refers to compiling the components of the planetary gear assembly 144 in a positionable unit. Thereafter, as shown in block 408, the desired position of the planetary gear assembly 144 is selected. If the first position is selected, then, as in block 412, the ring gear 232 is connected to the rotor 140. Next, the cover plate 156 is connected to the bowl 152 of the housing 148, such that the sun gear 236 is received by the opening 184. If the second position is selected, the sun gear 236 is connected to the rotor 140. Next, the cover plate 156 is connected to the bowl 152 of the housing 148, such that the ring gear 232 is received by the opening 184.

The planetary gear assembly 144 may be moved between the first and the second positions. In particular, to change the position of the planetary gear assembly 144 a user first removes the cover plate 156. Next, the planetary gear assembly 144 is moved away from the rotor 140 to right along the direction 288 to separate the planetary gear assembly from the rotor. This movement separates one group of the splines 256, 272 on the planetary gear assembly 144 from the splines 228 on the rotor 140. Thereafter, the planetary gear assembly 144 is oriented in the desired position. Next, the planetary gear assembly 144 is moved toward the rotor 140 to the left along the direction 288 to connect the assembly to the rotor in the desired position. This movement meshes the other group of the splines 256, 272 on the planetary gear assembly 144 with the splines 228 on the rotor 140. Next, the cover plate 156 is connected to the bowl 152 of the housing 148 to secure the position of the planetary gear assembly 144.

Available Gear Ratios of the Electric Motor Assembly

The configurability of the planetary gear assembly 144 enables the electric motor assembly 128 to generate a rotational output with a selectable gear ratio. Below, the available gear ratios for each position of the planetary gear assembly 144 are described. The different gear ratios enable the planetary gear assembly 144 to multiply the torque generated by the rotating rotor 140. Considering first the arrangement of FIG. 4, the planetary gear assembly 144 is shown in the first position with the shaft 146 connected to the output portion of the carrier 240. In this arrangement, the ring gear 232 is connected to the rotor 140 for rotation by the rotor, the carrier 240 is configured for rotation around the central axis of the sun gear 236, and the sun gear is fixed to the housing 148. Accordingly, in the first position, the planetary gear assembly 144 introduces a first gear ratio between the rotor 140 and the rotational output of the electric motor assembly 128, which, in this arrangement, is the output portion 280 (FIG. 5) of the carrier 240. An exemplary first gear ratio in this arrangement is 1.6 to 1 (rotation of rotor to rotation of carrier).

Considering now the arrangement shown in FIG. 9, the planetary gear assembly 144 is shown in the second position with shaft 146 still being connected to the output portion of the carrier 240. In this arrangement, the sun gear 236 is connected to the rotor 140 for rotation by the rotor, the carrier 240 is configured for rotation about the central axis of the sun gear, and the ring gear 232 is fixed to the housing 148. Accordingly, in the second position, the planetary gear assembly 144 introduces a second gear ratio between the rotor 140 and the output portion 280 (FIG. 5) of the carrier 240. An exemplary gear ratio in this arrangement is 2.7 to 1 (rotation of rotor to rotation of carrier).

It is noted that the same shaft 146 may be used in each of the above-described two arrangements. Additionally, the position of the shaft 146 remains the same in each of the arrangements. Accordingly, the electric motor assembly 128 is able to introduce two different gear ratios between the rotor 140 and the shaft 146 with exactly the same parts, only the relative position of the parts is changed.

As shown in FIG. 11, the planetary gear assembly 144 may be arranged to generate another gear ratio when configured in the first position. In this third arrangement, the ring gear 232 is connected to the rotor 140 for rotation by the rotor. The carrier 240 is fixed to the housing 148 such that the planet gears 244 may rotate about the posts 286 (FIG. 6), but may not revolve around the central axis of the sun gear 236. The carrier 240 may be fixed to the housing 148 with any method, as known to those of ordinary skill in the art. For example, as shown in FIG. 11, the carrier 240 may be fixed to the housing 148 with a fastening member such as post 270, which extends through the cover plate 156' and is received by a corresponding opening in the carrier 240. Notably, the sun gear 236 is received by the opening 184' in the cover plate 156', and is configured for rotation relative to the cover plate. Accordingly, the cover plate 156' does not engage the splines 272 of the sun gear 236 and enables the sun gear to rotate relative to the housing 148. The rotational output member of the planetary gear assembly 144 is the sun gear 236. To this end, a shaft 150 having a size different than the shaft 146 may be received by the sun gear 236 for rotation by the sun gear. The shaft 150 may be connected to the sun gear 236 in a manner similar or identical to the manner in which the shaft 146 is connected to the carrier 240. Therefore, in this arrangement, the planetary gear assembly 144 introduces a third gear ratio between the rotor 140 and the rotational output of the electric motor assembly 128. It is noted that an adapter member (not shown) may be provided such that the shaft 146 (FIGS. 4 and 9) may be used with this arrangement (FIG. 11) of the planetary gear assembly 144. The adapter may be positioned within the cavity defined by the sun gear 236.

Figure 12:
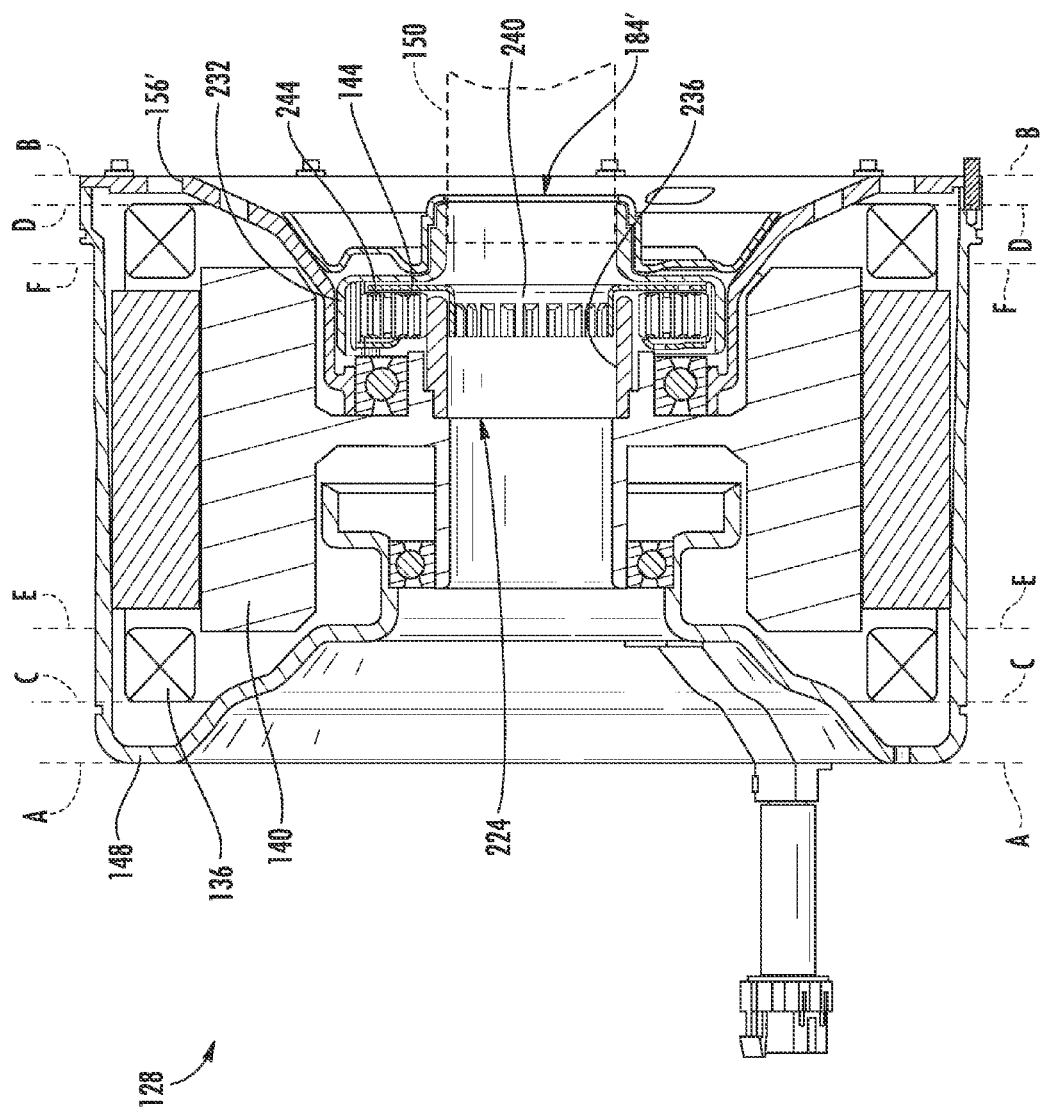
FIG. 12 is a cross sectional view of the electric motor assembly of FIG. 3, having the planetary gear assembly of FIG. 4 oriented in the second position and having an output shaft connected to a ring gear of the planetary gear assembly.

As shown in FIG. 12, the planetary gear assembly 144 may be arranged to generate yet another gear ratio (a fourth gear ratio considered thus far) when configured in the second position. In this arrangement, the sun gear 236 is connected to the rotor 140 for rotation by the rotor. The carrier 240 is fixed to the housing 148 such that the planet gears 244 may rotate about the posts 286 (FIG. 6), but may not revolve around the central axis of the sun gear 236. Notably, the ring gear 232 is received by the opening 184' in the cover plate 156', and is configured for rotation relative to the cover plate. Accordingly, the cover plate 156' does not engage the splines 256 of the ring gear 232 and, therefore, enables the ring gear to rotate relative to the housing 148 in response to rotation of the rotor 140. The rotational output of the planetary gear assembly 144 is the ring gear 232. To this end, the shaft 150 (also shown in FIG. 11) may be received by the ring gear 232 for rotation by the ring gear. Therefore, in this arrangement, the planetary gear assembly 144 introduces a fourth gear ratio between the rotor 140 and the rotational output of the electric motor assembly 128. It is noted that an adapter member (not shown) may be provided such that the shaft 146 (FIGS. 4 and 9) may be used with this arrangement (FIG. 12) of the planetary gear assembly 144. The adapter may be positioned within the cavity defined by the ring gear 232.

The planetary gear assembly 144 is configured to rotate an output shaft with at least four different gear ratios depending on the position and the configuration of the assembly. In at least some embodiments, a fifth output gear ratio of the planetary gear assembly 144 is also possible. In particular, a locked configuration may be achieved in which the output member of the planetary gear assembly 144 is rotated with a 1 to 1 gear ratio (rotation of rotor to rotation of output). For example, a locked configuration may be achieved with the planetary gear assembly 144 in the first position (FIG. 4) by connecting the carrier 240 to the ring gear 232 and utilizing the carrier as the rotational output of the electric motor assembly 128. Other locked configurations are possible with the planetary gear assembly 144 in the first and the second positions.

Compact Configuration of the Electric Motor Assembly

The position of the planetary gear assembly 144 relative to the stator 136 and the rotor 140 enables the electric motor assembly 128 to generate a comparatively high torque output from a compact package. For example, in a typical situation a planetary gear assembly is connected to an output shaft of an electric motor. In this example, a total length of the combination is defined by the axial length of the electric motor plus the axial length of the planetary gear assembly. The electric motor assembly 128 serves to reduce the total length of the previously described combination. As used herein, the axial length of the planetary gear assembly 144 is a length of the planetary gear assembly measured in the direction 288 of FIG. 4, and an axial length of the motor assembly 128 may be determined by the distance between the line A and the line B (also of FIG. 4) as measured in the direction 288.

With reference again to FIG. 4, in contrast to the typical electric motor and planetary gear assembly, the planetary gear assembly 144 does not contribute to the axial length of the electric motor assembly 128. For example, the planetary gear assembly 144 is positioned completely within the housing interior space (Lines A and B) and the stator interior space (Lines C and D); thus, the planetary gear assembly 144 does not contribute to the axial length of the motor assembly 128. Stated differently, the axial length of the planetary gear assembly 144 overlaps completely with the axial length of the stator 136, thus it is the axial length of the stator determines the axial length of the motor assembly 128.

The compact arrangement of the motor assembly 128 enables the components of the planetary gear assembly 144 to be positioned within the various above-described interior spaces. As shown in FIG. 4, in the first position the ring gear 232, the carrier 240, and the planet gears 244 are positioned completely within the housing internal space (Lines A and B), the stator internal space (Lines C and D), and the rotor internal space (Lines E and F). Whereas, the sun gear 236, is positioned completely within the housing internal space (Lines A and B) and the stator internal space (Lines C and D), and positioned partially within the rotor internal space (Lines E and F). As shown in FIG. 9, in the second position the sun gear 236, the carrier 240, and the planet gears 244 are positioned completely within the housing internal space (Lines A and B), the stator internal space (Lines C and D), and the rotor internal space (Lines E and F). Whereas, the ring gear 232, is positioned completely within the housing internal space (Lines A and B) and the stator internal space (Lines C and D), and positioned partially within the rotor internal space (Lines E and F).

The electric motor assembly 128 described herein incorporates the planetary gear assembly 144 within the housing, stator, and rotor interior spaces such that the benefits of the planetary gear assembly (high torque output, among others) are realized without an increase in the axial length of the motor assembly. For these reasons and others, the electric motor assembly 128 is useful in applications that require an electric motor, which generates a large amount of torque, but that has a small form factor, such as in hybrid vehicles and electric vehicles.

In another embodiment, (not illustrated) the planetary gear assembly 144 contributes to the axial length of the electric motor assembly 128. In this embodiment, the axial length of the planetary gear assembly 144 only partially overlaps with the axial length of the stator 136, such that the planetary gear assembly extends from the stator interior space. This extension from the stator interior space results in an increase in the axial length of the motor assembly 128. For example, at least 50% of the axial length of the planetary gear assembly 144 is within the stator interior space. In another example, at least 75% of the axial length of the planetary gear assembly 144 is within the stator interior space. In yet another example, at least 90% of the axial length of the planetary gear assembly 144 is within the stator interior space. In each of the above-described examples the housing interior space is also increased in response to the position of the planetary gear assembly 144. The increase in the housing interior space increases the length of the housing in the direction 288.

Electric Traction Motor Configuration

Figure 13:
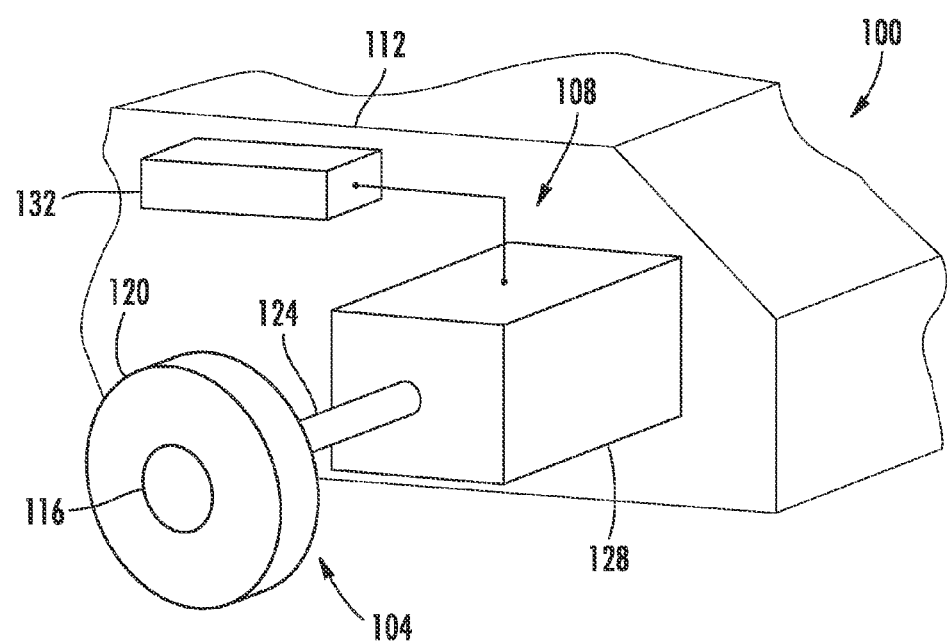
FIG. 13 is a side perspective view illustrating a portion of the vehicle of FIG. 1, the electric motor assembly of FIG. 3 being in a traction motor configuration.

As shown in FIG. 13, the electric motor assembly 128 may be configured to function as an electric traction motor for the vehicle 100 in which it is positioned. As the term is used herein, a traction motor generates a drive torque for moving a vehicle. The electric motor assembly 128, in FIG. 13, is connected directly to the axle 124 to provide a drive torque for the traction member 104 without a transmission element being interposed between the electric motor assembly and the axle. Accordingly, the wheel 116 and tire 120 rotate with the same angular velocity as the output member of the planetary gear assembly 144. A large percentage of the torque generated by the electric motor assembly 128 is transmitted directly to the wheel 116.

In operation, the drive system 108 rotates a portion of the traction member 104 in order to move the vehicle 100. Specifically, the speed controller 132 sends a signal to the winding 204 of the stator 136 which causes the rotor 140 to rotate with a particular angular velocity. Rotation of the rotor 140 causes the output member of the planetary gear assembly 144 to rotate. The rotation of the output member is coupled directly to the traction member 104 in order to move the vehicle 100. The drive system 108 is suitable for use with any type of vehicle 100 including vehicles powered by both electric motors and internal combustion engines, commonly referred to as "hybrid" vehicles as well as fully electric vehicles. Accordingly, in some embodiments the rotational output of the drive system 108 may be coupled to the traction member 104 via a transmission and/or a differential among other types of mechanical transmission devices.

Figure 14:
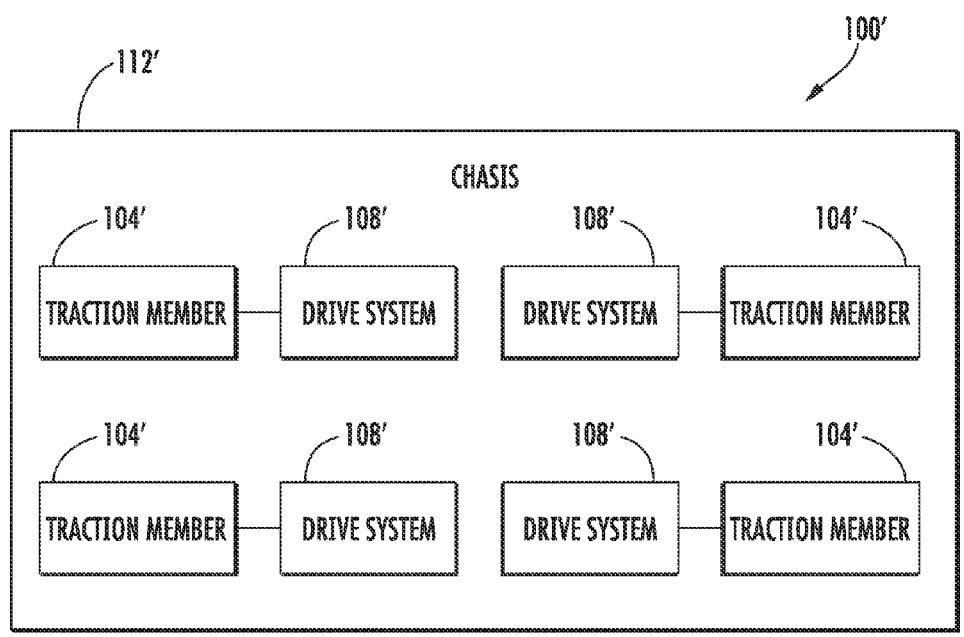
FIG. 14 is a block diagram illustrating an alternative embodiment of the vehicle of FIG. 1, which includes numerous drive systems and traction members.

As shown in FIG. 14, another embodiment of the vehicle 100' includes numerous drive systems 108' each being associated with one of numerous traction members 104'. The drive system 108' and traction members 104' are positioned within a chassis 112'. In this embodiment, each traction member 104' is independently driven and controlled by its associated drive system 108'. One or more of the drive systems 108' may be configured in a traction motor arrangement, as described above.

Figure 15:
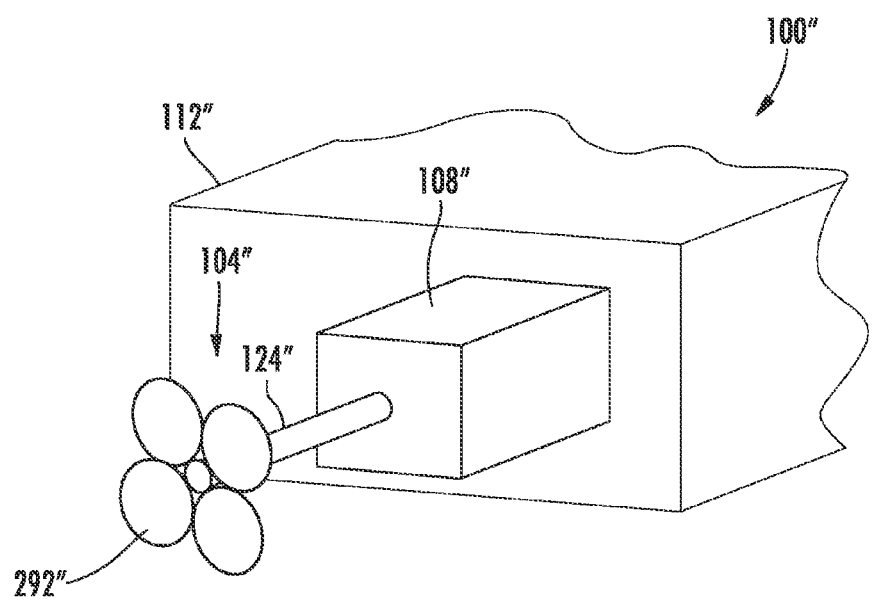
FIG. 15 is a rear perspective view illustrating an alternative embodiment of the vehicle of FIG. 1, the vehicle being a watercraft.

In another embodiment, as shown in FIG. 15, the chassis 112" is an element of a watercraft vehicle 100". Exemplary watercrafts 100" include boats, personal watercraft, and the like. In this embodiment the traction member 104" assembly includes an axle 124" and a propeller 292" configured to generate a traction force, which moves the watercraft 100" when rotated under water.

While the invention has been described with reference to exemplary embodiments, it will be understood by those skilled in the art that other implementations and adaptations are possible. For example, various changes may be made and equivalent elements may be substituted for elements thereof without departing from the scope of the invention. In addition, many modifications may be made to adapt a particular situation or material to the teachings of the invention without departing from the essential scope thereof. Also, there are advantages to individual advancements described herein that may be obtained without incorporating other aspects described herein. Therefore, it is intended that the invention not be limited to the particular embodiment disclosed for carrying out this invention, but that the invention will include all embodiments falling within the scope of the appended claims.

What is claimed is:

1. An electric motor assembly comprising:
   a stator defining a first interior space;
   a rotor at least partially positioned within the first interior space and configured for rotation relative to the stator, the rotor defining a second interior space;
   a planetary gear assembly at least partially positioned within the second interior space, the planetary gear assembly comprising a planetary gear member including a toothed portion configured to engage a plurality of planet gears and a connection portion extending from the toothed portion, the planetary gear member configured for selective placement in a first position and a second position, wherein the connection portion engages the rotor when the planetary gear member is in the first position and wherein the connection portion engages a component of the electric motor other than the rotor when the planetary gear member is in the second position; and
   an output member connected to the planetary gear assembly, wherein a gear ratio of the rotor to the output member is different when the planetary gear member is in the first position than when the planetary gear member is in the second position.

2. The electric motor assembly of claim 1, the stator comprising:
   a first plurality of end turns extending from a first end of the stator; and
   a second plurality of end turns extending from a second end of the stator, wherein the planetary gear assembly is completely positioned between the first and the second plurality of end turns.

3. The electric motor assembly of claim 2, the planetary gear assembly further comprising a carrier connected to the plurality of planet gears.

4. The electric motor assembly of claim 1, the rotor comprising:
a plurality of permanent magnets.

5. The electric motor assembly of claim 1 wherein the plurality of planet gears is positioned completely within the second interior space.

6. The electric motor assembly of claim 5, the planetary gear assembly further comprising:
a carrier connected to the plurality of planet gears, the carrier including an output connection portion connected to an output of the electric motor assembly,
wherein the carrier is positioned completely within the second interior space.

7. The electric motor assembly of claim 1, further comprising:
a housing,
wherein the stator, the rotor, and the planetary gear assembly are at least partially positioned within the housing.

8. The electric motor assembly of claim 7, wherein
the planetary gear member is a ring gear and the connection portion of the ring gear is connected to the housing when the ring gear is in the second position,
the planetary gear assembly further comprising a sun gear configured for connection to the housing when the ring gear is in the first position and configured for connection to the rotor when the ring gear is in the second position.

9. The electric motor assembly of claim 1 wherein a rotational output of the planetary gear assembly provides a drive torque for moving a vehicle associated with the electric motor assembly.

10. An electric motor assembly comprising:
a housing defining an internal space;
a stator positioned within the internal space;
a rotor associated with the stator and at least partially positioned within the internal space; and
a planetary gear assembly coupled between the rotor and the housing, the planetary gear assembly comprising a planetary gear member, the planetary gear member including a first portion and a second portion, the first portion configured to engage planet gears of the planetary gear assembly, and the second portion configured to selectively engage the rotor when the planetary gear member is placed in a first position and the housing when the planetary gear member is placed in a second position.

11. The electric motor assembly of claim 10 wherein the planetary gear assembly is completely positioned within the internal space.

12. The electric motor assembly of claim 10 wherein the stator defines an internal cavity and the planetary gear assembly is completely positioned within the internal cavity.

13. The electric motor assembly of claim 12 wherein the rotor defines an internal region and the planetary gear assembly is at least partially positioned within the internal region.

14. The electric motor assembly of claim 13 wherein the planetary gear member is a ring gear of the planetary gear assembly, the planetary gear assembly further comprising:
a sun gear, the plurality of planet gears configured to engage meshingly the ring gear and the sun gear.

15. The electric motor assembly of claim 14 wherein the plurality of planet gears is completely positioned within the internal region.

16. The electric motor assembly of claim 14 wherein:
the sun gear is configured for connection to the housing when the ring gear is in the first position, and
the sun gear is configured for connection to the rotor when the ring gear is in the second position.

17. The electric motor assembly of claim 10 wherein a rotational output of the planetary gear assembly provides a drive torque for moving a vehicle associated with the electric motor assembly.

18. An electric motor assembly comprising:
a housing defining a first internal space;
a stator positioned completely within the first internal space and defining a second internal space, the second internal space extending from a first end turn of the stator to a second end turn of the stator;
a rotor positioned completely within the first internal space and positioned completely within the second internal space, the rotor being configured for rotation relative to the stator; and
a planetary gear assembly comprising a planetary gear member including a first portion configured to engage a plurality of planet gears and a second portion extending from the first portion, the planetary gear member configured for selective placement in a first position and a second position, wherein the second portion engages the rotor when the planetary gear member is in the first position and wherein the second portion engages the housing when the planetary gear member is in the second position,
wherein the planetary gear assembly provides a rotational output of the electric motor assembly, the rotational output when the planetary gear member is in the first position different from the rotational output when the planetary gear member is in the second position.

19. The electric motor assembly of claim 18 wherein the planetary gear assembly is positioned completely within the second internal space.

20. The electric motor assembly of claim 18, wherein the planetary gear member is a ring gear of the planetary gear assembly, the planetary gear assembly further comprising a sun gear configured to meshingly engage the plurality of planet gears.

* * * * *